(12) United States Patent
Matsushiro et al.

(10) Patent No.: US 6,362,581 B1
(45) Date of Patent: *Mar. 26, 2002

(54) DEVICE AND METHOD FOR STARTING A BRUSHLESS MOTOR

(75) Inventors: Hideo Matsushiro, Kusatsu; Takahito Chinomi, Shiga-ken, both of (JP)

(73) Assignee: Matsushita Electric Industrial Co., Ltd., Osaka-fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/326,685

(22) Filed: Jun. 7, 1999

(30) Foreign Application Priority Data

Jun. 8, 1998 (JP) .............................. 10-158981

(51) Int. Cl.⁷ ................................ H02P 6/22
(52) U.S. Cl. ................ 318/254; 318/138; 318/439
(58) Field of Search ................. 318/254, 759, 318/760, 138, 439

(56) References Cited

U.S. PATENT DOCUMENTS

| 4,426,606 A | * | 1/1984 | Suita et al. .................. 318/375 |
| 4,484,114 A | * | 11/1984 | Ebbs .......................... 318/138 |
| 4,748,387 A | * | 5/1988 | Tanuma et al. .............. 318/254 |
| 4,814,676 A | * | 3/1989 | Van Hout .................... 318/254 |
| 4,912,379 A | * | 3/1990 | Matsuda et al. ............. 318/254 |
| 5,280,222 A | * | 1/1994 | Von Der Heide et al. ... 318/138 |
| 5,602,449 A | * | 2/1997 | Krause et al. ............... 318/254 |
| 5,637,974 A | * | 6/1997 | McCann ....................... 318/701 |
| 5,973,461 A | * | 10/1999 | Permuy ........................ 318/254 |

FOREIGN PATENT DOCUMENTS

JP 10-191682 7/1998

* cited by examiner

*Primary Examiner*—Robert E. Nappi
*Assistant Examiner*—Rita Leykin
(74) *Attorney, Agent, or Firm*—Wenderoth, Lind & Ponack, L.L.P.

(57) ABSTRACT

Device and method are provided for starting a brushless motor easily enables reliable motor starting, and prevents overcurrent supply when starting the motor. The permanent magnet rotor is firstly positioned by supplying current from one phase to another phase (or the other two phases) before starting the motor. The motor is then started by controlling the switch-operation of the switching devices of the inverter based on output signals from Hall ICs which detect the pole position of the magnet rotor. Thus positioning the rotor before starting motor ensures output of stable Hall IC signals, and enables the brushless motor to be started without affection of electrical noise or the slight moving of the magnet rotor.

10 Claims, 13 Drawing Sheets

| OUTPUT SIGNAL FROM HALL IC | | | TURNED ON SWITING DEVICE | |
|---|---|---|---|---|
| Hu | Hv | Hw | UPPER ARM | LOWER ARM |
| Low | High | Low | U | V |
| Low | High | High | U | W |
| Low | Low | High | V | W |
| High | Low | High | V | U |
| High | Low | Low | W | U |
| High | High | Low | W | V |

DEVICE AND METHOD FOR STARTING A BRUSHLESS MOTOR

This application is based on application No. H10-158981 filed in Japan, the contents of which is hereby incorporated by reference.

BACKGROUND OF THE INVENTION

1. Field of the Invention

The present invention relates to a device and method for starting a brushless motor incorporating a magnetic field sensor for detecting a pole position of a permanent magnet rotor.

2. Description of the Related Art

Brushless motors are used widely in consumer appliances and electronics today as a result of demand for products with longer service life and high reliability. The air conditioner using brushless motors for the compressor motor and the fan motor have been developed and commercialized.

Brushless motors used for fan motors in particular have a magneto-electric conversion device or a magnetic field sensor such as a Hall IC for detecting the pole position of a permanent magnet of the rotor in the motor. The output signal from the magneto-electric conversion device can then be used to detect rotational speed or position of the rotor, or control driving signals for on/off operation of switching devices within an inverter.

A typical method for drive control of a brushless motor having magneto-electric conversion devices according to the related art is described below.

Figure 15:
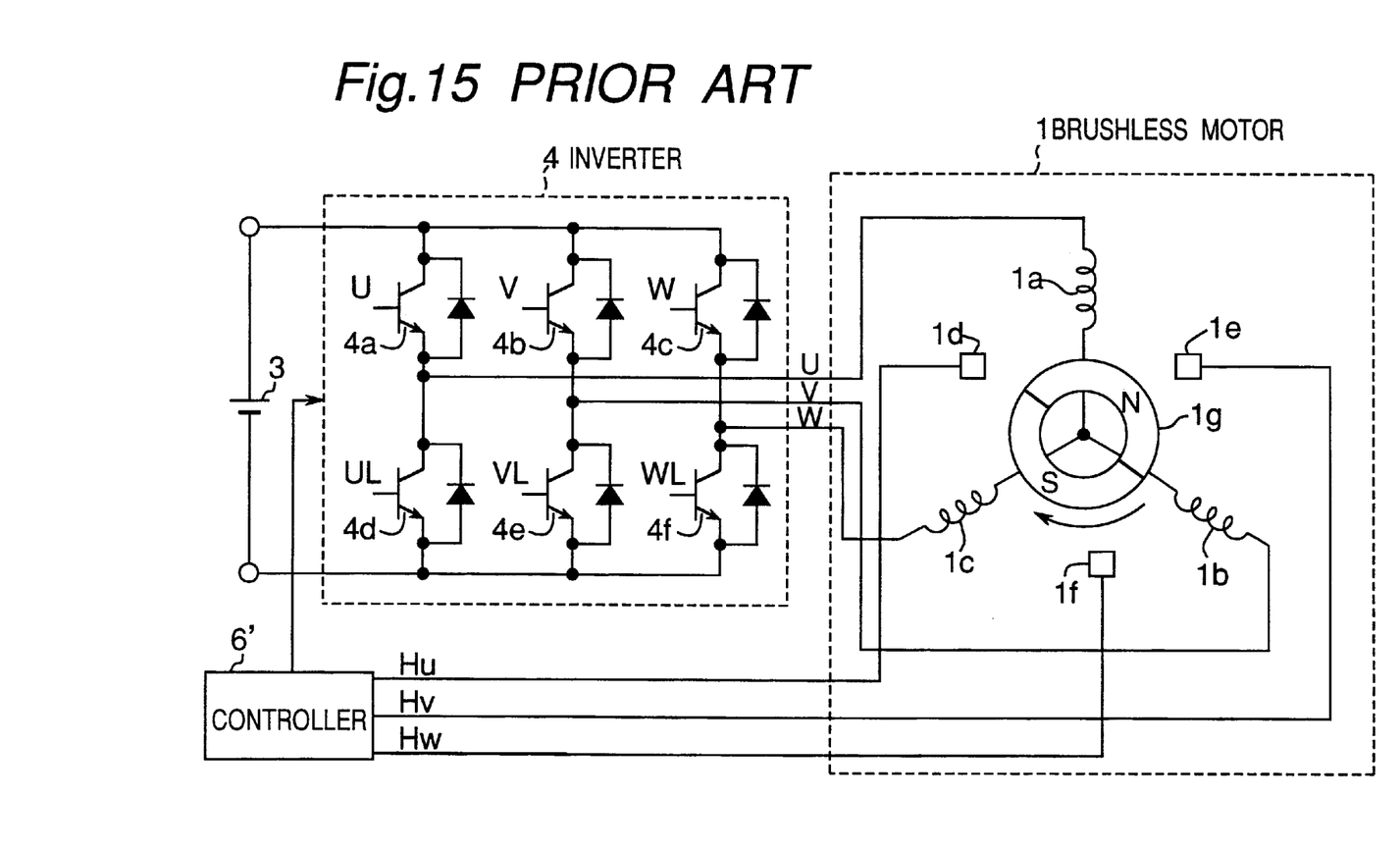
FIG. 15 is a schematic diagram of a brushless motor drive device according to the related art.

FIG. 15 shows a typical drive device for a brushless motor. The brushless motor 1 has Hall ICs 1d, 1e, and 1f as magneto-electric conversion devices. The Hall ICs 1d, 1e and 1f output respective signals to a controller 6'.

Drive signals are generated based on the output signals from the Hall ICs 1d–1f to control the on/off operation of switching devices 4a–4f in an inverter 4, and are output from the controller 6'. The drive signals control the terminal voltages of the brushless motor 1. Current thus flows to the windings of the stator 1a, 1b and 1c, and the brushless motor 1 turns.

The general starting method of a brushless motor having a magneto-electric conversion device is described next.

For convenience of discussion, it is assumed that the Hall ICs 1d, 1e and 1f output "High" when they are near to the north pole of a permanent magnet composing a rotor 1g, and output "Low" when they are near to the south pole. It is also assumed that when the switching device 4a, 4b or 4c on each upper arm of the inverter 4 is on and current flows from the stator winding 1a, 1b or 1c to an neutral point, the side of the winding facing to the magnet rotor is north, and that when the switching device 4d, 4e or 4f on each lower arm is on and current flows from the neutral point to a winding, the side of the winding facing to the rotor 1g is south.

Figure 16:
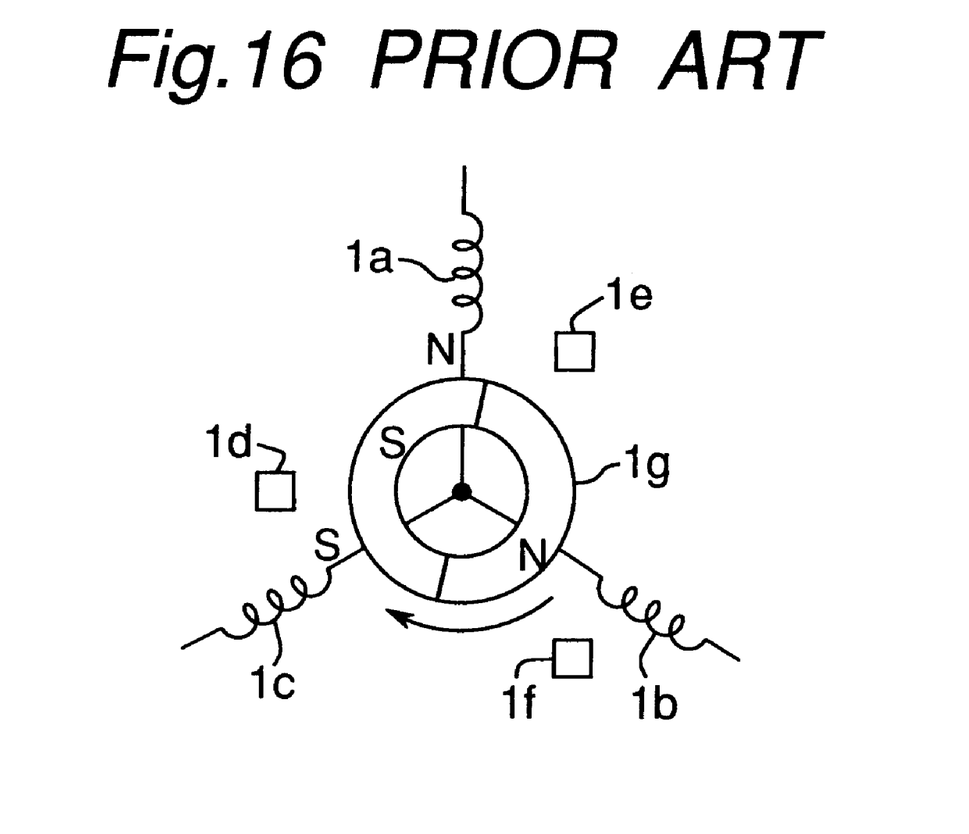
FIG. 16 is a schematic diagram showing the position of the rotor in a motor to describe detection of the rotor position by using Hall ICs.

When the rotor 19 is positioned relative to the Hall ICs 1d–1f as shown in FIG. 16, the output signal from Hall IC 1d is Low, and the output signals from Hall ICs 1e and 1f are High. It will thus be obvious that the position of the rotor 1g can be determined based on the output signals from the Hall ICs.

After the position of the rotor 1g is recognized based on the Hall IC output signal such that the rotor 1g is stopped at the position as shown in FIG. 16, the switching device 4a of the upper arm to U-phase and the switching device 4f of the lower arm to W-phase are turned on. As a result, the side of the U-phase winding 1a facing to the rotor 1g is magnetized to north, and the side of W-phase winding 1c facing to the rotor 1g is magnetized to south. The U-phase winding 1a and the rotor 1g thus attract, and W-phase winding 1c and the rotor 1g repulse. This allows the rotor 1g to begin to turn. The switching devices of the inverter are thereafter switched alternately on and off based on the output signals from the Hall ICs, repeatedly changing the attraction-repulsion relationship between the windings and the magnet rotor. The brushless motor is thus rotationally driven as the magnet rotor chases the alternating magnetic field.

This conventional control method of the brushless motor has the following problem. The output signals from the Hall ICs may be inconstant in the case where some of Hall ICs are near to the boundary between magnetic poles of the rotor 1g, and the rotor 1g tremors due to vibration before start. The inconstant signals are applied to a microprocessor and used to control driving of switching devices. However this inconstant signals make it difficult for the microprocessor to determine which switching devices of the inverter should be on, and may obstruct the normal starting process.

SUMMARY OF THE INVENTION

An object of the present invention is directed to a device for starting a brushless motor whereby the brushless motor can be easily and reliably started, and an overcurrent is not produced when the brushless motor is started.

In order to overcome the disadvantages of the prior art, a device is provided for starting a brushless motor having a plurality of stator windings forming predetermined phases, a rotor with a permanent magnet and a plurality of magnetic field sensors for detecting a pole position of the rotor.

The starting device comprises an inverter and a controller. The inverter has a plurality of switching elements in a bridge connection for supplying current to the brushless motor. The controller generates and applies, based on output signals from the magnetic field sensors, control signals for controlling operation of the switching elements of the inverter. Before brushless motor starting the controller positions the rotor by supplying current between at least two phases of the stator windings, and then outputs the control signals based on signals output from the magnetic field sensors to start the brushless motor. As a result, stable output signals can be obtained from the magnetic field sensors regardless of the permanent magnet rotor position before motor starting, and the motor can be reliably started.

The controller may position the rotor by supplying current from one phase to another phase of the stator windings when the level inversion point of signal output from each magnetic field sensor is within an electrical angle range of ±15 degrees to the zero cross point of the stator winding induced voltage.

Alternately, the controller may position the rotor by supplying current from one phase to the other two phases of the stator windings when the level inversion point of signal output from each magnetic field sensor is within an electrical angle range from +15 degrees to +45 degrees of the zero cross point of the stator winding induced voltage. This makes it possible to limit the maximum current supply required to position the rotor when the permanent magnet rotor is slightly turning at the controller's positioning the rotor.

Furthermore, the controller may brake the rotor by supplying current to the switching devices on lower arms of the bridge before positioning the rotor.

Furthermore, the controller may detect rotational speed of the brushless motor based on the output signals from the magnetic field sensors, and brake the rotor until the detected rotational speed is lower than a predetermined level.

This invention also provides a method for starting a brushless motor having a plurality of stator windings, a rotor with a permanent magnet and a plurality of magnetic field sensors for detecting a pole position of the rotor, the method comprising the steps of positioning the rotor by supplying current to stator windings of predetermined phases to set the rotor at a start position where the signals from the magnetic field sensors can be reliably detected, and starting the brushless motor.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 is a table showing the relationship between Hall IC output signals and the inverter switching device to be turned on.

DESCRIPTION OF THE PREFERRED EMBODIMENTS

The preferred embodiments of a device for driving a motor according to the present invention are described below with reference to the accompanying drawings. Each device described below provides current to at least two of the stator windings for predetermined phases before the motor starting process, thereby firstly positioning a rotor of the motor at a reliably detectable position. The device then detects the rotor position and begins supplying current to start the motor. As a result, the motor can be reliably started regardless of where the permanent magnet rotor is stopped before the motor starts.

(Embodiment 1)

Figure 1:
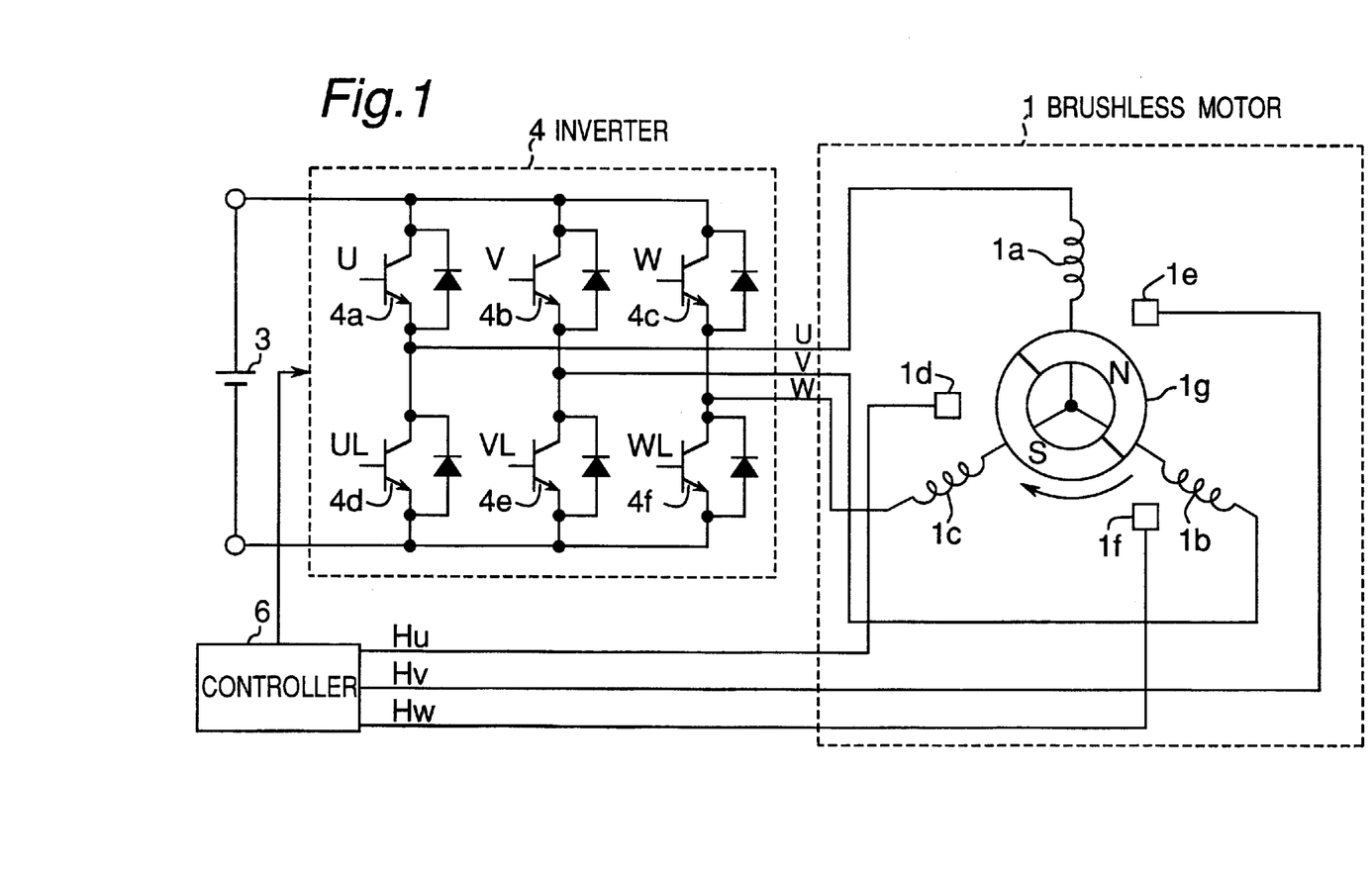
FIG. 1 is a schematic diagram of a brushless motor drive device according to a first embodiment of the present invention.

FIG. 1 shows a configuration of a motor drive device in a first embodiment according to the invention. As shown in FIG. 1, this motor drive device comprises a DC power source 3, an inverter 4 for converting voltage from output of the DC power source 3 to power for driving a brushless motor 1, and a controller 6 for controlling operation of the inverter 4.

The brushless motor 1 comprises stator windings 1a, 1b and 1c forming U-, V- and W-phases, respectively, Hall ICs 1d, 1e and 1f as magnetic field sensors or magneto-electric conversion devices for detecting each induced voltage for U-, V- or W-phase winding and for passing signals corresponding to the detected voltages, and a rotor 1g comprising a two-pole permanent magnet.

The inverter 4 comprises switching devices 4a, 4b and 4c on upper arms connected to phases U, V and W, and switching devices 4d, 4e and 4f on lower arms connected to phases U, V, and W.

The rotor 1g of the brushless motor 1 of this embodiment turns clockwise as seen in FIG. 1. The Hall IC 1d is disposed 90 degrees advanced from U-phase winding 1a. The Hall ICs 1e, 1f are likewise disposed 90 degrees advanced from windings 1b, 1c, respectively.

Figure 2:
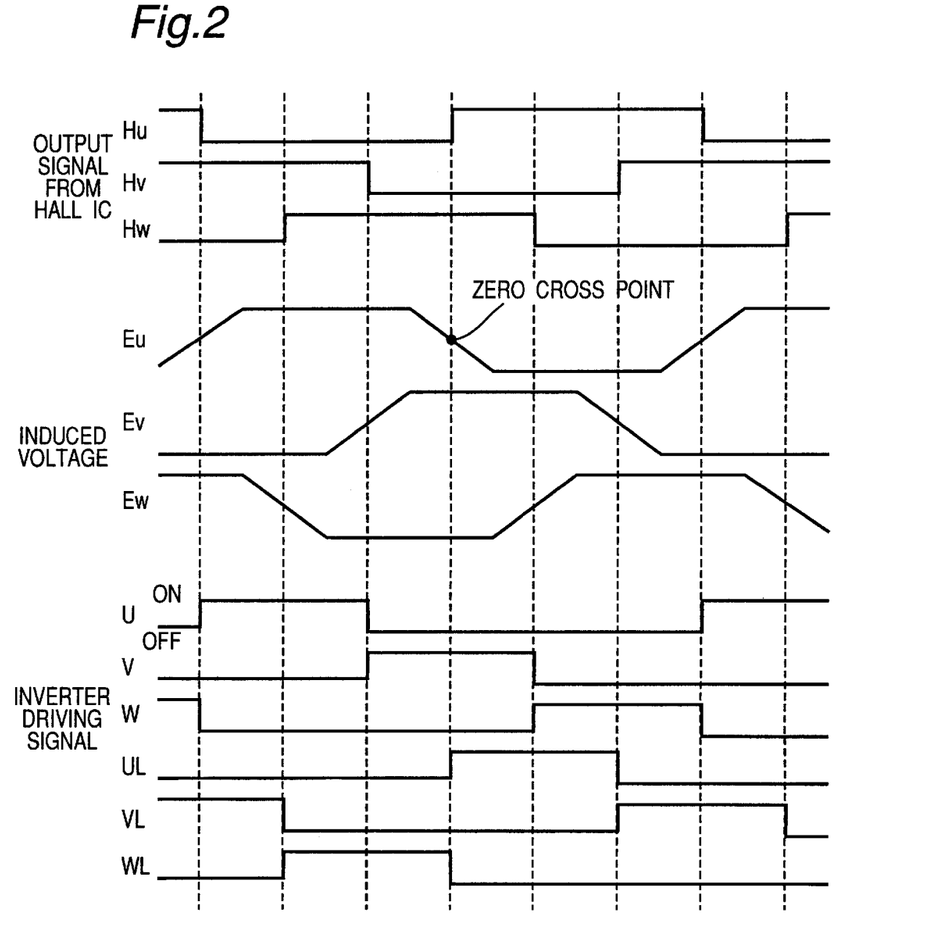
FIG. 2 a schematic diagram showing the relationship between Hall IC output signals, induced voltages on stator windings, and driving signals for inverter switching devices in a brushless motor drive device of the first embodiment.

FIG. 2 shows the relationship between induced voltages Eu, Ev and Ew induced on each phase winding 1a, 1b and 1c, the Hall IC output signals Hu, Hv and Hw, and the signals for driving the switching operation of switching devices 4a–4f in the inverter 4, in the brushless motor having Hall ICs 1d, 1e and 1f as disposed above. When the Hall ICs are advanced 90 degrees relative to each winding as shown in FIG. 1, the Hall IC output signals Hu, Hv and Hw invert at the zero cross point of induced voltage Eu, Ev and Ew while the brushless motor 1 is turning. More specifically, Hall IC output signal inversion occurs at an electrical angle of 0 degrees from the zero cross point of the induced voltage for each phase. Brushless motor's rotation is controlled by turning on and off switching devices 4a–4f according to the output signals from the Hall ICs 1d–1f as shown in FIG. 2.

Figure 3:
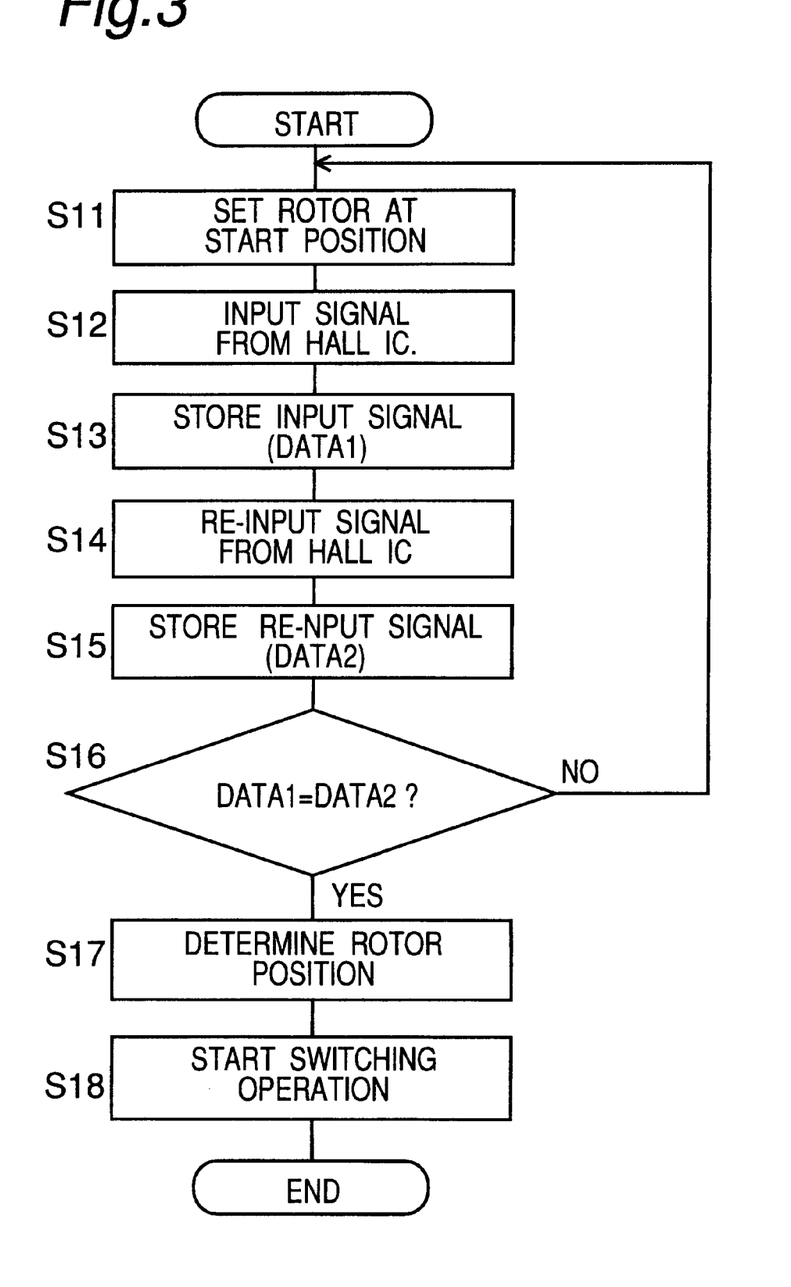
FIG. 3 is a flow chart of the process before motor starting by a brushless motor drive device of the first embodiment.

FIG. 3 is a flow chart for control of the start of brushless motor according to the embodiment. This start process is performed by the controller 6 shown in FIG. 1.

Before the brushless motor is started, the controller 6 first positions the magnet rotor 1g of the brushless motor 1 at a start position suitable for detecting rotor position (S11). Positioning the rotor 1g at the start position is accomplished by supplying current through a pair of windings corresponding to predetermined phases of the motor 1. That is, the rotor 1$g$ is set at the start position by supplying current from one of windings 1$a$–1$c$ to the other one of windings 1$a$–1$c$. This is hereafter referred to as "one to one phase current supply."

The controller 6 then inputs the output signals from each of the Hall ICs 1$d$–1$f$ (S12), and stores the input signals as DATA1 to a predetermined area in memory (S13). The controller 6 then again inputs the output signals from the Hall ICs 1$d$–1$f$ (S14), and stores the input signals as DATA2 to a predetermined area in memory (S15). It is then determined whether or not the signals DATA1 and DATA2 input in steps S12 and S14 are the same (S16). Inputting the Hall IC signals twice or multiple times is because of avoiding possible noise affection to improve reliability. When the signals do not match, the procedure loops back to step S11, and repeats. When the signals match, the position of the permanent magnet rotor 1$g$ is determined or detected based on the stored signals (DATA1 and DATA2) (S17), and switching operation of the switching devices 4$a$–4$f$ of the inverter 4 is then started based on the determined position (S18).

Figure 4:
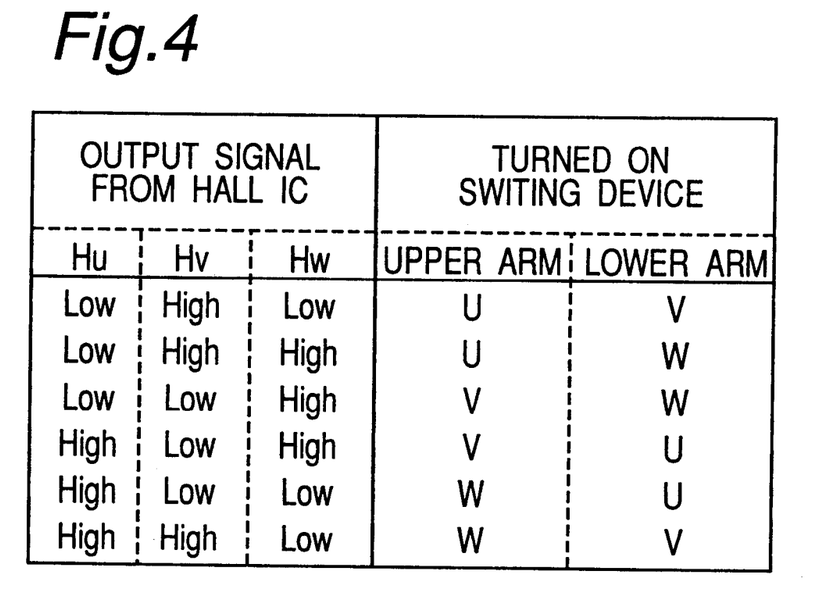

The controller 6 determines which switching devices begin switching based on the position detection signals from the Hall ICs 1$d$–1$f$. FIG. 4 shows a table providing information by which the switching devices are determined to be switched based on the position detection signals from the Hall ICs. For example, when the signals output from the Hall ICs Hu, Hv and Hw are Low, High and Low, respectively, after the initial positioning, the upper arm of U-phase (that is, switching device 4$a$) and the lower arm of V-phase (that is, switching device 4$e$) are turned on.

The brushless motor drive device according to this embodiment thus initially positions the permanent magnet rotor by means of the "one to one phase current supply" before starting the motor, thereby moving the motor to a position where the position of the magnet rotor 1$g$ can be reliably detected.

Figure 5:
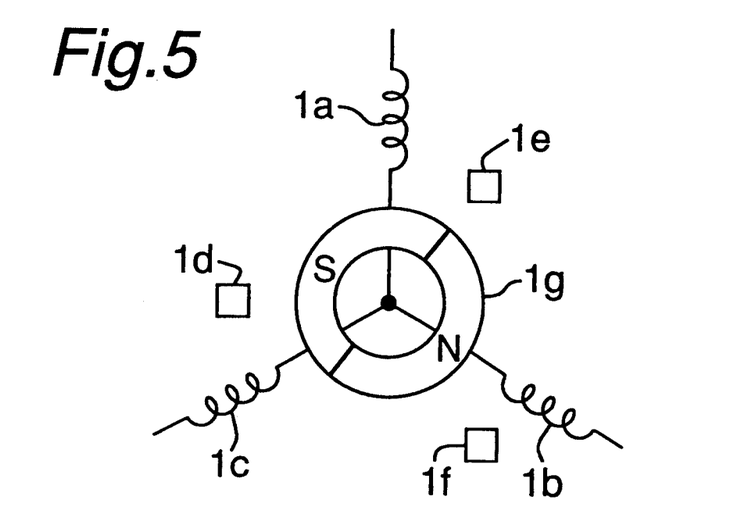
FIG. 5 is a schematic diagram showing the position of the rotor inside the motor before rotor positioning in the brushless motor drive device of the first embodiment.
Figure 6:
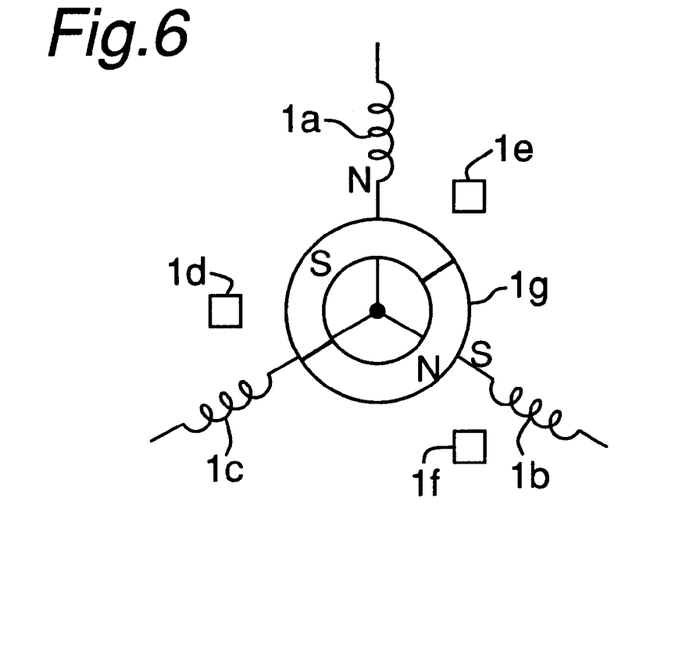
FIG. 6 is a schematic diagram showing the position of the rotor inside the motor soon after rotor positioning in the brushless motor drive device of the first embodiment.
Figure 7:
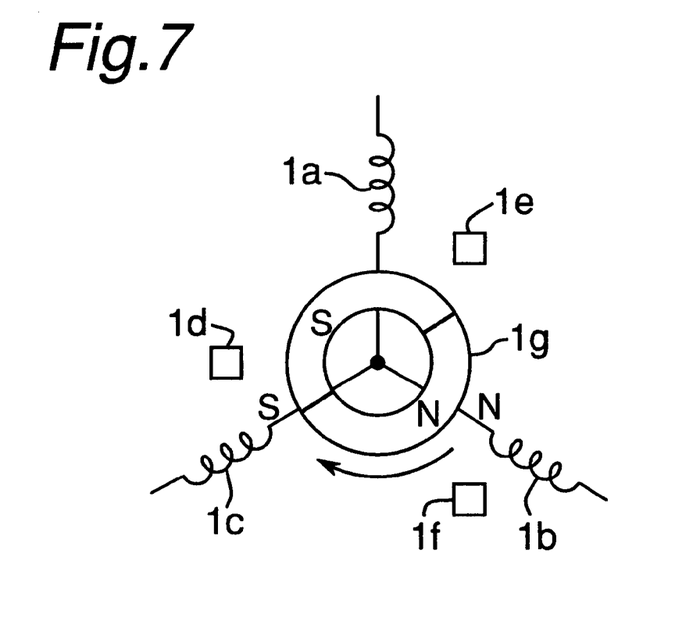
FIG. 7 is a schematic diagram showing the position of the rotor inside the motor when drive signals are applied after rotor positioning in the brushless motor drive device of the first embodiment.

For example, when the magnet rotor 1$g$ is positioned as shown in FIG. 5 immediately before starting, the controller 6 cannot detect or determine the position of the rotor 1$g$ because the output signal of Hall IC 1$e$ can be either of High and Low, that is, not be fixed. Therefore, the magnet rotor 1$g$ is positioned by applying one-to-one phase current supply to switch on the upper arm of U-phase and the lower arm of V-phase. This magnetizes the U-phase winding 1$a$ on the magnet rotor side to north, and the V-phase winding 1$b$ on the magnet rotor side to south, positioning the magnet rotor 1$g$ as shown in FIG. 6. The output signals of Hall IC 1$d$ and Hall IC 1$e$ are therefore stably Low, and the output signal of Hall IC 1$f$ is stably High. The V-phase upper arm and W-phase lower arm are turned on based on the position detection signals from the Hall ICs 1$d$–1$f$ and the table shown in FIG. 4 for the Hall IC output states. This causes repulsion between the north pole of V-phase winding 1$b$ and the north pole of the magnet rotor, and attraction between the south pole of the W-phase winding 1$c$ and the north pole of the magnet rotor 1$g$. The magnet rotor 1$g$ thus begins turning as shown in FIG. 7. While the U-phase upper arm and V-phase lower arm are on for positioning the rotor in this exemplary embodiment, positioning can be accomplished by similarly turning on the upper and lower arms for any other phases.

As described above, a brushless motor drive device according to this preferred embodiment supplies current to a single phase before the brushless motor starting so as to position the brushless motor to a position where the position of the magnet rotor can be reliably detected. This therefore ensures the reliable start of the brushless motor irrespective of the position at which the permanent magnet rotor is stopped before setting of the start position.

While this preferred embodiment of the invention has been described with each Hall IC disposed 90 degrees to the winding of the corresponding phase, output signals from the Hall ICs can be reliably detected by applying the one to one phase current supply positioning method insofar as the Hall ICs are positioned 90±15 degrees of the corresponding windings. That is, when the Hall ICs are disposed at 105 degrees (=90+15 degrees) to the respective windings, each Hall IC output signal inverts at an electrical angle of −15 degrees from the zero cross point of induced voltage on the winding. When the Hall ICs are disposed at 75 degrees (=90−15 degrees) to the respective windings, each Hall IC output signal inverts at an electrical angle of +15 degrees from the zero cross point of induced voltage on the winding. Therefore, the motor can be positioned by means of the one to one phase current supply so that the Hall IC output signals stabilize, even if the Hall IC output signals invert in an electrical angle range of ±15 degrees from the zero cross point of the winding induced voltage.

(Embodiment 2)

Figure 8:
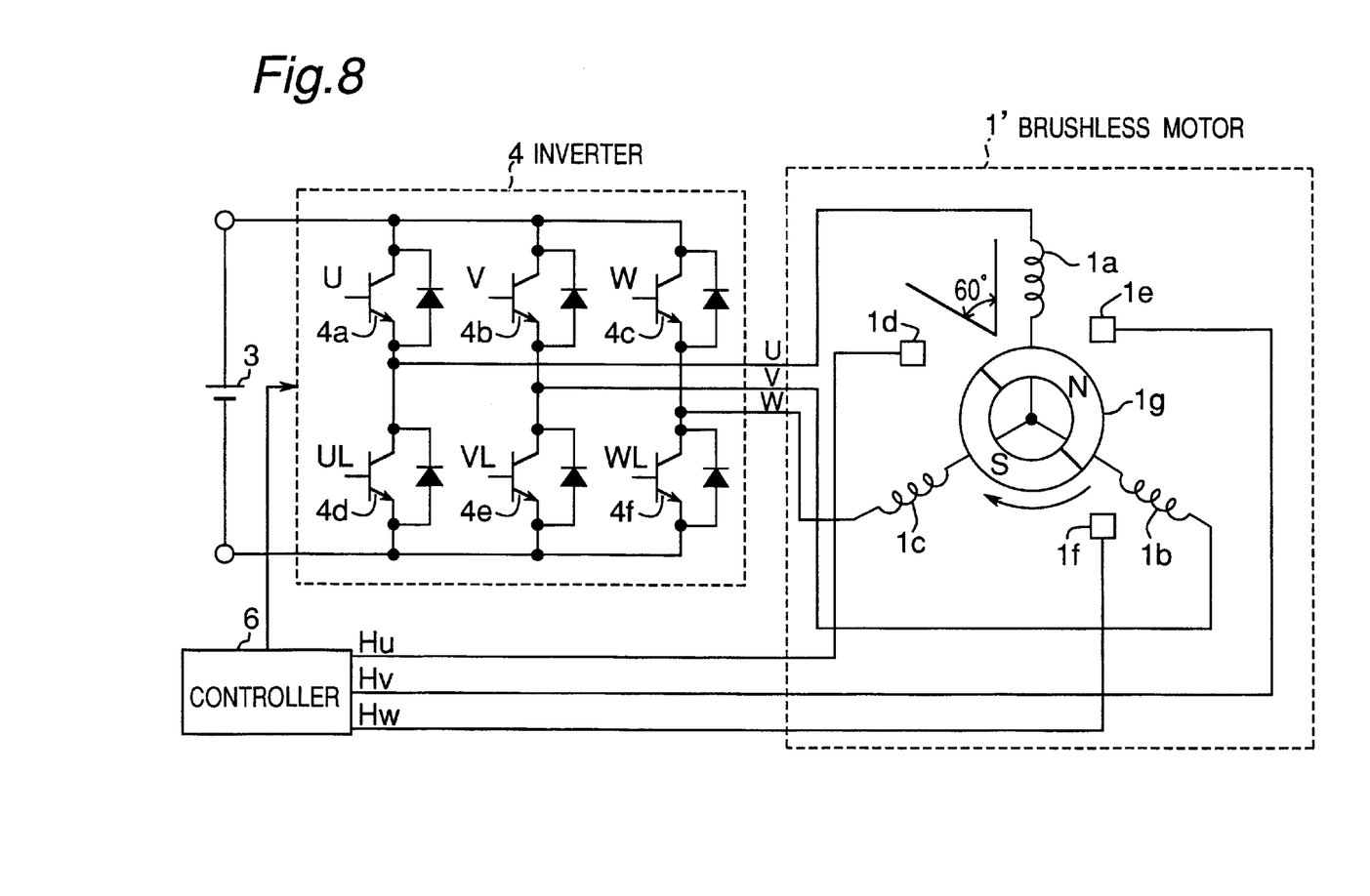
FIG. 8 is a schematic diagram of a brushless motor drive device according to a second embodiment of the present invention.

FIG. 8 shows a brushless motor drive device according to a second embodiment of the present invention. The brushless motor drive device according to this embodiment differs from that of the first in the relative positions of the Hall ICs 1$d$, 1$e$ and 1$f$ and windings 1$a$, 1$b$ and 1$c$. That is, the magnet rotor 1$g$ turns clockwise as shown in FIG. 8, and the Hall IC 1$d$ is disposed 60 degrees in advance of U-phase winding 1$a$. Hall ICs 1$e$ and 1$f$ are likewise disposed 60 degrees in advance of windings 1$b$ and 1$c$.

In the first embodiment, the magnet rotor 1$g$ is positioned by the one to one phase current supply, and one of boundaries of magnet poles of the rotor 1$g$ moves to a position 60 degrees from one of windings (as shown in FIG. 6). In this embodiment, however, when the one to one phase current supply method is applied to the brushless motor drive device, one pole boundary of the magnet rotor 1$g$ also positioned at one of the Hall ICs 1$d$–1$f$, and thus the Hall IC output signals cannot be recognized. Therefore, the brushless motor drive device of this embodiment energizes stator windings by supplying current from one phase to the other two phases (one to two phase current supply), which is described more fully below, so that the position of the permanent magnet rotor 1$g$ can be reliably detected.

Figure 9:
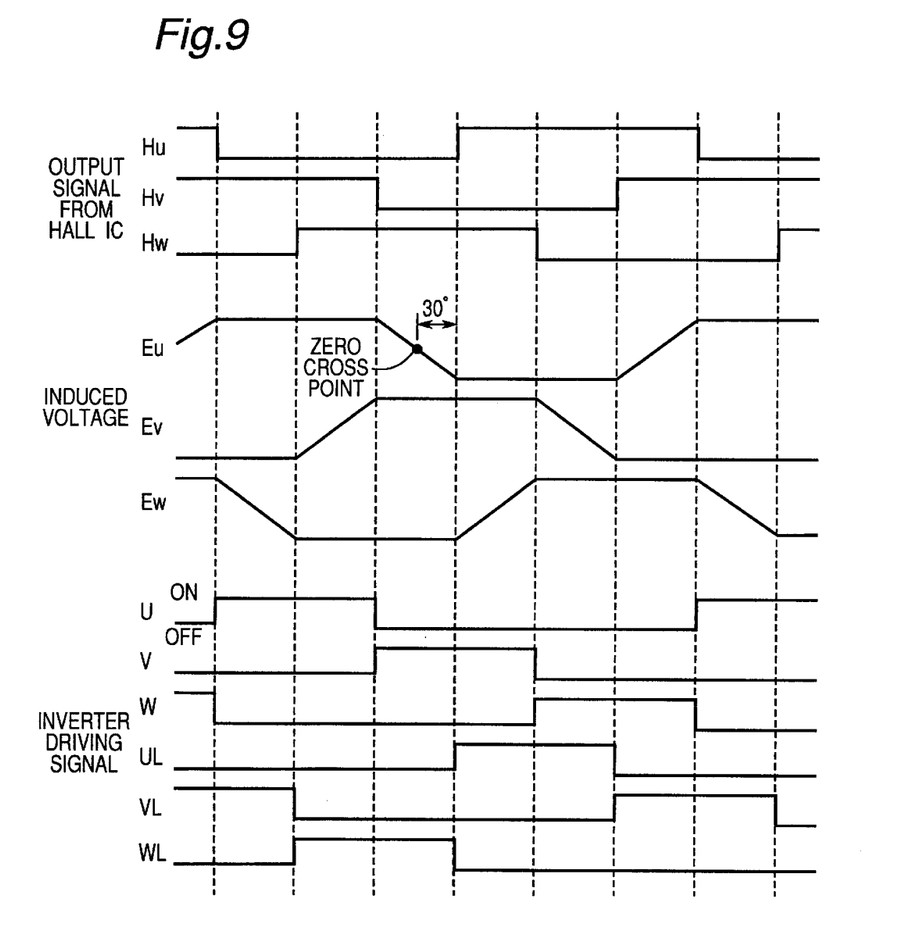
FIG. 9 is a schematic diagram showing the relationship between Hall IC output signals, induced voltages on stator windings, and drive signals for inverter switching devices in the brushless motor drive device of the second embodiment.

As shown in FIG. 9, the Hall IC output signals in a brushless motor 1' of the present embodiment invert at a +30 degree electrical angle from the zero cross point of the induced voltage of each phase when the motor is turning. After initial rotor positioning, this exemplary brushless motor drive device can rotationally drive the brushless motor 1' by simply turning on the switching devices selected from the table shown in FIG. 4 based on the Hall IC output signal.

Figure 10:
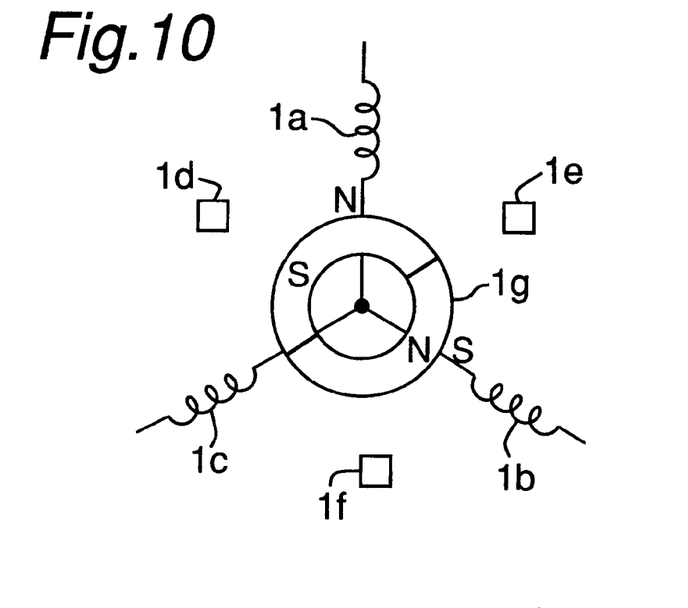
FIG. 10 is a schematic diagram showing the magnetization states inside the motor before rotor positioning in a brushless motor drive device according to a second embodiment of the present invention.
Figure 11:
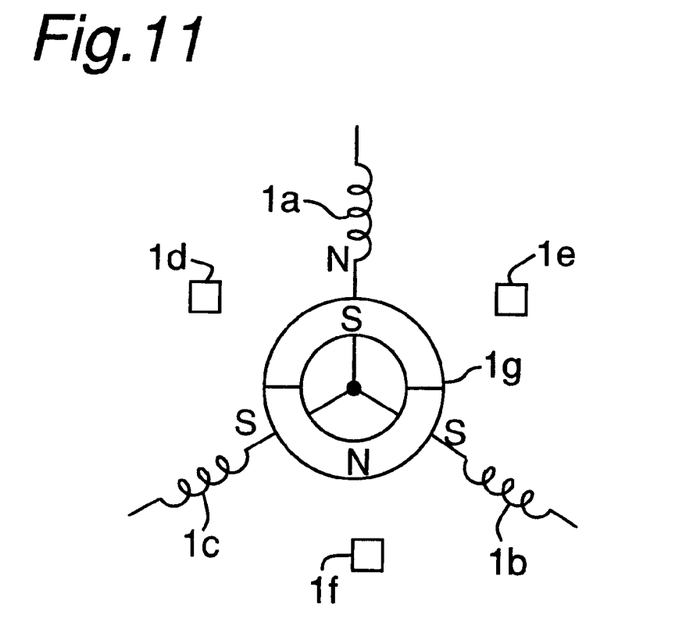
FIG. 11 is a schematic diagram showing the position of the rotor inside the motor soon after rotor positioning in the brushless motor drive device of the second embodiment.
Figure 12:
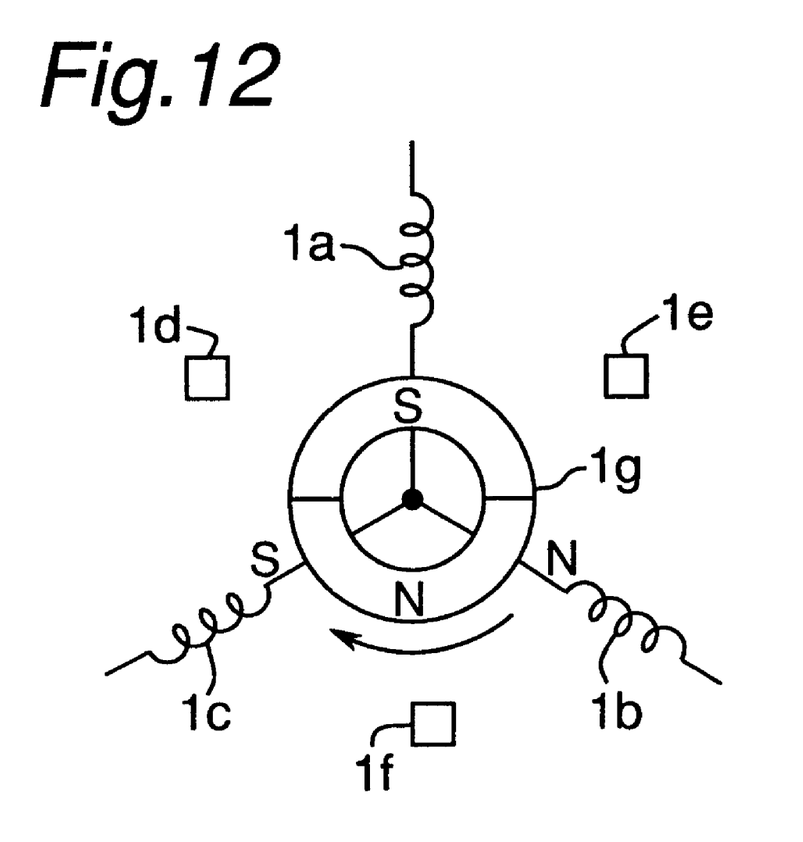
FIG. 12 is a schematic diagram showing the position of the rotor inside the motor when drive signals are applied after rotor positioning in the brushless motor drive device of the second embodiment.

For example, when the magnet rotor 1$g$ is positioned as shown in FIG. 10 before the motor 1' is started, the Hall IC 1$e$ is positioned in a pole boundary of the magnet rotor 1$g$. The output signal therefrom is therefore unstable and the controller 6 cannot determine whether the signal is High or Low. Current is therefore supplied to turn on the upper arm of U-phase and the lower arms of V- and W-phases. This method of supplying current is herein referred to as "one to two phase current supply". By thus supplying current, the U-phase winding 1$a$ on the side of the magnet rotor 1$g$ is magnetized as a north pole, the V-phase winding 1$b$ on the side of the magnet rotor 1$g$ is magnetized as south pole, and the W-phase winding 1$c$ on side of the magnet rotor 1$g$ is magnetized as south pole, as shown in FIG. 11. Then, the magnet rotor 1g moves to a position as shown in this figure. Hall ICs 1d and 1e thus output stably Low, Hall IC 1f outputs stably high, and these output signals can be detected. The V-phase upper arm and W-phase lower arm are turned on based on the output signals from the Hall ICs 1d–1f with reference to the table in FIG. 4. This occurs north-north repulsion between V-phase winding 1b and the magnet rotor 1g, and north-south attraction between W-phase winding 1c and the magnet rotor 1g. This causes the magnet rotor 1g to begin turning as shown in FIG. 12. It will be obvious to those skilled in the art that while the U-phase upper arm and V- and W-phase lower arms are turned on for positioning the rotor in this embodiment, positioning can be accomplished by similarly turning arms on in other phase combinations.

Even if the Hall IC output signals remain unstable after positioning by means of the one to one phase current supply, the one to two phase current supply can provide a stable signal to move the rotor to a position whereat Hall IC output stabilizes, thereby enabling reliable motor starting.

This preferred embodiment of the invention has been described with the Hall ICs disposed 60 degrees to the winding of the corresponding phase. However, output signals from the Hall ICs can be reliably detected in the one to two phase current supply positioning manner insofar as the Hall ICs are positioned within ±15 degrees of this 60 degree position. That is, the motor can be positioned by means of the one to two phase current supply so that the Hall IC output signals stabilize insofar as the Hall IC output signals invert in electrical angle range from +15 to +45 degrees with reference to the zero cross point of the winding induced voltage.

(Embodiment 3)

Figure 13:
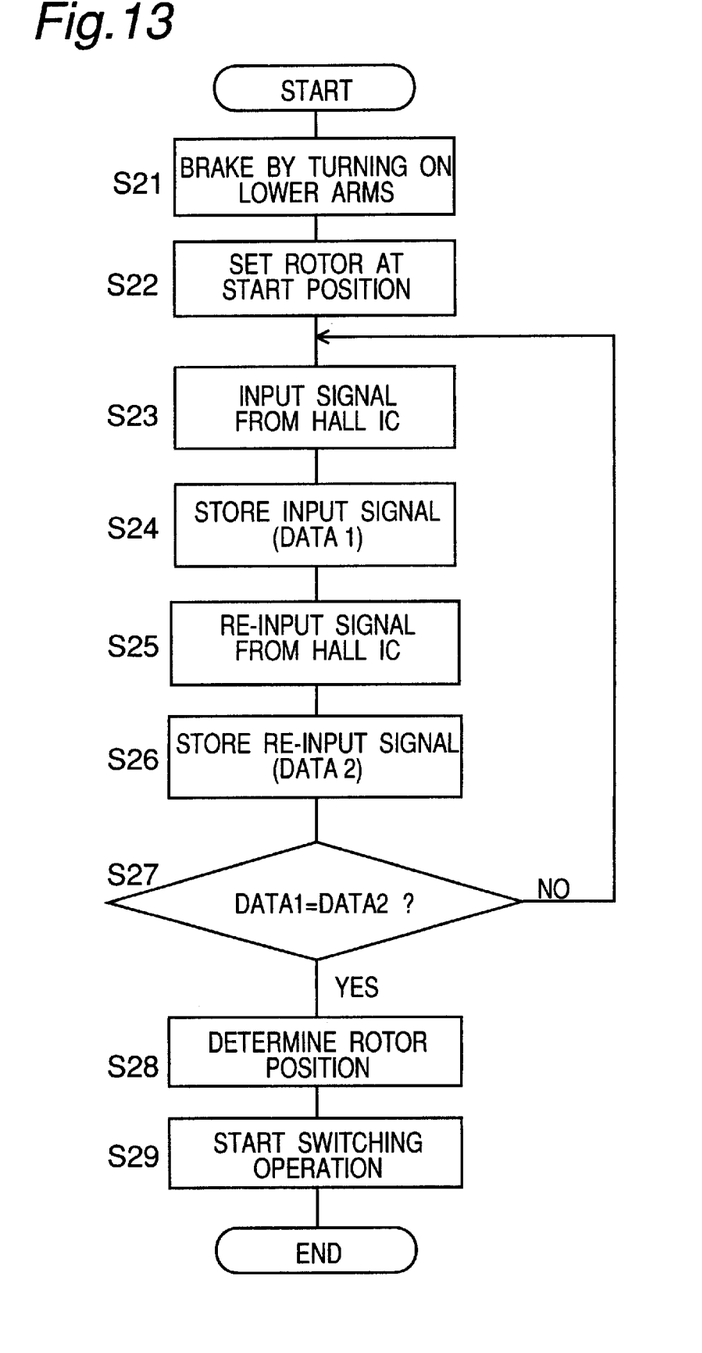
FIG. 13 is a flow chart of the process before motor starting by a brushless motor drive device according to a third embodiment of the present invention.

A brushless motor drive device according to a third embodiment of the present invention brakes the magnet rotor by turning on switching devices of lower arms before positioning the rotor by means of the one to one phase current supply or the one to two phase current supply. FIG. 13 is a flow chart of the starting process of the brushless motor drive device of this embodiment.

Referring to FIG. 13, this starting process starts by braking the magnet rotor 1g by turning on switching devices of lower arms which are connected to low voltage side (S21). The magnet rotor 1g is then positioned by the one to one phase current supply or the one to two phase current supply (S22). The controller 6 then inputs the output signals from each of the Hall ICs. 1d–1f (S23), and stores the signals as DATA1 to a predetermined area in memory (S24). The controller 6 then again inputs the output signals from Hall ICs 1d–1f (S25), and stores the signals as DATA2 to a predetermined area in memory (S26). It is determined whether or not the signals (DATA1 and DATA2) stored in steps S24 and S26 are the same (S27). When the signals do not match, the procedure loops back to step S23, and repeats. When the signals match, the position of the rotor 1g is determined based on the stored signals (DATA1 and DATA2) (S28), and switching the switching devices 4a–4f of the inverter 4 is then started according to the determined position (S29).

By thus braking the magnet rotor 1g before rotor positioning, the brushless motor drive device according to this embodiment can prevent an overcurrent from flowing as a result of the one to one phase current supply or the one to two phase current supply, even if the rotor is slightly turning by wind etc. before the motor is started.

(Embodiment 4)

A brushless motor drive device according to a fourth embodiment of the present invention detects the rotational speed of a brushless motor (rotor) before rotor positioning in the starting process. When the brushless motor is determined to be turning based on the detected rotational speed, the magnet rotor 1g is braked until the rotational speed falls below a predetermined threshold level.

Figure 14:
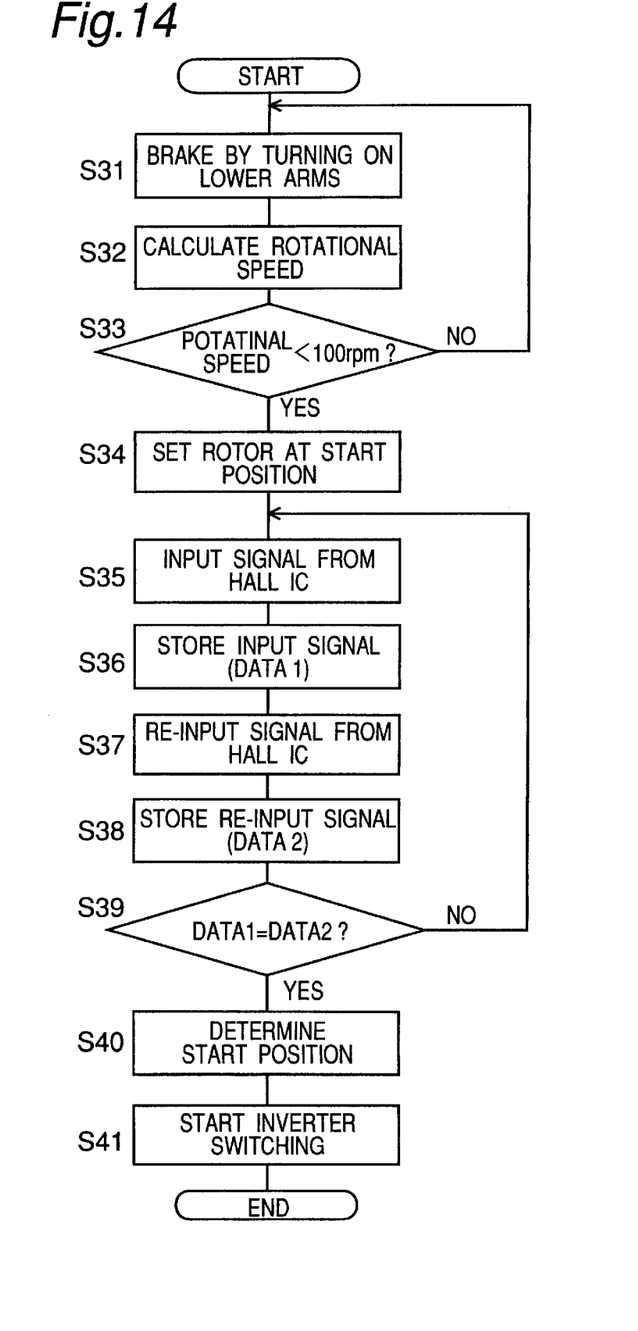
FIG. 14 is a flow chart of the process before motor starting by a brushless motor drive device according to a fourth embodiment of the present invention.

FIG. 14 is a flow chart of the starting process of the brushless motor drive device according to this fourth embodiment.

Referring to FIG. 14, the controller 6 first turns on switching devices on lower arms of the bridge to brake the magnet rotor 1g (S31), and then detects or calculates the rotational speed of the magnet rotor 1g based on the output signals from the Hall ICs 1d–1f (S32). It is determined whether or not the detected rotational speed is not less than a predetermined value (for example, 1000 rpm) (S33). When the detected rotational speed is equal or more to the predetermined threshold speed (1000 rpm), the starting process loops back to step S31. Steps S31 to S33 thereafter repeat until the rotational speed drops below the predetermined threshold speed.

When the detected rotational speed is below the threshold speed, the controller 6 positions the magnet rotor 1g at a position ensuring detection of the rotor position by the one to one phase current supply or the one to two phase current supply (S34). The controller 6 then inputs the output signals from each of the Hall ICs 1d–1f to detect the position of the magnet rotor 1g, and begins switching the inverter switching devices (S35–S41) in a same manner as described in FIG. 3 or FIG. 13 to start the motor.

As described above, the brushless motor drive device according to this preferred embodiment brakes the magnet rotor 1g until the rotational speed of the rotor 1g falls below a predefined threshold level when the brushless motor is detected to be turning with the speed exceeding the threshold level before starting the motor. Thus current can be limited below a predetermined level when positioning the rotor 1g by means of the one to one phase current supply or the one to two phase current supply. The current used for rotor positioning can thus be regulated.

For example, when the brushless motor drive device is used in the fan motor of the outdoor unit of an air conditioning system and wind causes the fan associated with the fan motor to turn, the maximum current flowing during positioning by means of the one to one phase current supply or the one to two phase current supply can be limited. This provides greater flexibility in product design for selecting the switching devices of the inverter.

It will also be obvious to those skilled in the art that while the present invention has for simplicity been described using the magnet rotor with two poles, the same operation and advantages can be achieved by the magnet rotor with four or more poles.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A device for starting a brushless motor having a plurality of stator windings forming predetermined phases, a rotor with a permanent magnet and a plurality of magnetic field sensors for detecting a pole position of the rotor, the device comprising:

an inverter having a plurality of switching elements in a bridge connection for supplying current to the brushless motor; and a controller for generating and outputting, based on signals output from the magnetic field sensors, control signals for controlling switching operation of the switching elements of the inverter, wherein said controller is operable to position the rotor to a start position where signals from the magnetic field sensors can be reliably detected by supplying current at least between two phases of the stator windings, and receive a plurality of times the output signals from the magnetic field sensors for determining a position of the rotor, and afterward to output the control signals based on the rotor position determined by the output signals from the magnetic field sensors so as to start the brushless motor.

2. A device for starting a brushless motor having a plurality of stator windings forming predetermined phases, a rotor with a permanent magnet and a plurality of magnetic field sensors for detecting a pole position of the rotor, the device comprising:

an inverter having a plurality of switching elements in a bridge connection for supplying current to the brushless motor; and a controller for generating and outputting, based on signals output from the magnetic field sensors, control signals for controlling switching operation of the switching elements of the inverter, wherein said controller is operable to position the rotor to a start position where signals from the magnetic field sensors can be reliably detected by supplying current at least between two phases of the stator windings, and afterward to output the control signals based on the output signals from the magnetic field sensors so as to start the brushless motor, and wherein the controller positions the rotor by supplying current from one phase to another phase of the stator windings when the level inversion point of signal output from each magnetic field sensor is within an electrical angle range of ±15 degrees to the zero cross point of induced voltage on the stator winding.

3. A device for starting a brushless motor having a plurality of stator windings forming predetermined phases, a rotor with a permanent magnet and a plurality of magnetic field sensors for detecting a pole position of the rotor, the device comprising:

an inverter having a plurality of switching elements in a bridge connection for supplying current to the brushless motor; and a controller for generating and outputting, based on signals output from the magnetic field sensors, control signals for controlling switching operation of the switching elements of the inverter, wherein said controller is operable to position the rotor to a start position where signals from the magnetic field sensors can be reliably detected by supplying current at least between two phases of the stator windings, and afterward to output the control signals based on the output signals from the magnetic field sensors so as to start the brushless motor, and, wherein the controller positions the rotor by supplying current from one phase to the other two phases of the stator windings when the level inversion point of signal output from each magnetic field sensor is within an electrical angle range from +15 degrees to +45 degrees of the zero cross point of induced voltage on the stator winding.

4. A device for starting a brushless motor having a plurality of stator windings forming predetermined phases, a rotor with a permanent magnet and a plurality of magnetic field sensors for detecting a pole position of the rotor, the device comprising:

an inverter having a plurality of switching elements in a bridge connection for supplying current to the brushless motor; and a controller for generating and outputting, based on signals output from the magnetic field sensors, control signals for controlling switching operation of the switching elements of the inverter, wherein said controller is operable to position the rotor to a start position where signals from the magnetic field sensors can be reliably detected by supplying current at least between two phases of the stator windings, and afterward to output the control signals based on the output signals from the magnetic field sensors so as to start the brushless motor, and wherein the controller brakes the rotor by supplying current to the switching devices on lower arms of the bridge before positioning the rotor.

5. The device according to claim 4, wherein the controller detects rotational speed of the brushless motor based on the output signals from the magnetic field sensors, and brakes the rotor until the detected rotational speed is lower than a predetermined level.

6. A method for starting a brushless motor having a plurality of stator windings forming predetermined phases, a rotor with a permanent magnet and a plurality of magnetic field sensors for detecting a pole position of the rotor, the method comprising:

positioning the rotor by supplying current at least between two phases of the stator windings to set the rotor at a start position where the signals from the magnetic field sensors can be reliably detected;

receiving a plurality of times the output signals from the magnetic field sensors to determine a position of the rotor; and outputting control signals to start the brushless motor based on the rotor position.

7. A method for starting a brushless motor having a plurality of stator windings forming predetermined phases, a rotor with a permanent magnet and a plurality of magnetic field sensors for detecting a pole position of the rotor, the method comprising:

positioning the rotor by supplying current at least between two phases of the stator windings to set the rotor at a start position where the signals from the magnetic field sensors can be reliably detected; and starting the brushless motor, wherein said positioning comprises supplying current from one phase to another phase of stator windings of the motor when the level inversion point of signal output from each magnetic field sensor is within an electrical angle range of ±15 degrees to the zero cross point of induced voltage on the stator winding.

8. A method for starting a brushless motor having a plurality of stator windings forming predetermined phases, a rotor with a permanent magnet and a plurality of magnetic field sensors for detecting a pole position of the rotor, the method comprising:

positioning the rotor by supplying current at least between two phases of the stator windings to set the rotor at a start position where the signals from the magnetic field sensors can be reliably detected; and starting the brushless motor, wherein said positioning comprises supplying current from one phase to the other two phases of stator windings of the motor when the level inversion point of signal output from each magnetic field sensor is within an electrical angle range from +15 degrees to +45 degrees of the zero cross point of induced voltage on the stator winding.

9. A method for starting a brushless motor having a plurality of stator windings forming predetermined phases, a rotor with a permanent magnet and a plurality of magnetic field sensors for detecting a pole position of the rotor, the method comprising:

positioning the rotor by supplying current at least between two phases of the stator windings to set the rotor at a start position where the signals from the magnetic field sensors can be reliably detected;

starting the brushless motor; and braking the rotor by supplying current to the switching devices on lower arms before positioning the rotor.

10. The method according to claim 9, further comprising detecting rotational speed of the brushless motor based on the output signals from the magnetic field sensors, and braking the rotor until the detected rotational speed is lower than a predetermined level.

* * * * *